United States Patent

[11] 3,591,963

| | | |
|---|---|---|
| [72] | Inventor | Gerhard Kopp |
| | | Munich, Germany |
| [21] | Appl. No. | 833,017 |
| [22] | Filed | June 13, 1969 |
| [45] | Patented | July 13, 1971 |
| [73] | Assignee | Entwicklungsring Sud GmbH |
| | | Munich, Germany |
| [32] | Priority | June 18, 1968 |
| [33] | | Germany |
| [31] | | P 17 51 550.3 |

[54] INFLATABLE SEAL FOR AIRCRAFT JET ENGINES
11 Claims, 7 Drawing Figs.

[52] U.S. Cl..................................... 60/39.31,
277/29, 277/34.3
[51] Int. Cl...................................... F02c 7/20,
F16j 15/46
[50] Field of Search.......................... 277/29, 34,
34.3, 34.6; 60/39.31, 39.32, 39.09

[56] References Cited
UNITED STATES PATENTS

| 2,720,011 | 10/1955 | Krupp | 277/34 |
|---|---|---|---|
| 2,744,382 | 5/1956 | Sokol et al. | 60/39.09 |
| 2,828,823 | 4/1958 | Mounce | 277/34.6 |
| 3,302,396 | 2/1967 | Robbins | 60/39.09 |
| 3,338,049 | 8/1967 | Fernberger | 60/39.09 |

*Primary Examiner*—Samuel Rothberg
*Attorney*—William K. Serp

ABSTRACT: A sealing means for providing a seal between the intake of a jet engine and the receiving ring of an air intake duct mounted upon the airframe. The sealing means includes a cylinder of flexible material, one end of which is secured to the intake duct. Formed integrally with the cylinder and located adjacent the end of the cylinder farthest from the engine is an inflatable annular tube. Located within the tube is a resilient flattening member which, upon deflation of the tube, expands to flatten the tube so as to facilitate installation or removal of the engine. The interior of the tube is, through a directional flow control valve, in communication with the exhaust air chamber of the engine so that the exhaust gases will maintain the tube in an inflated condition. Disposed about a portion of the outer surface of the tube are a plurality of lands which enhance the sealing characteristics between the tube and the associated portion of the aircraft structure.

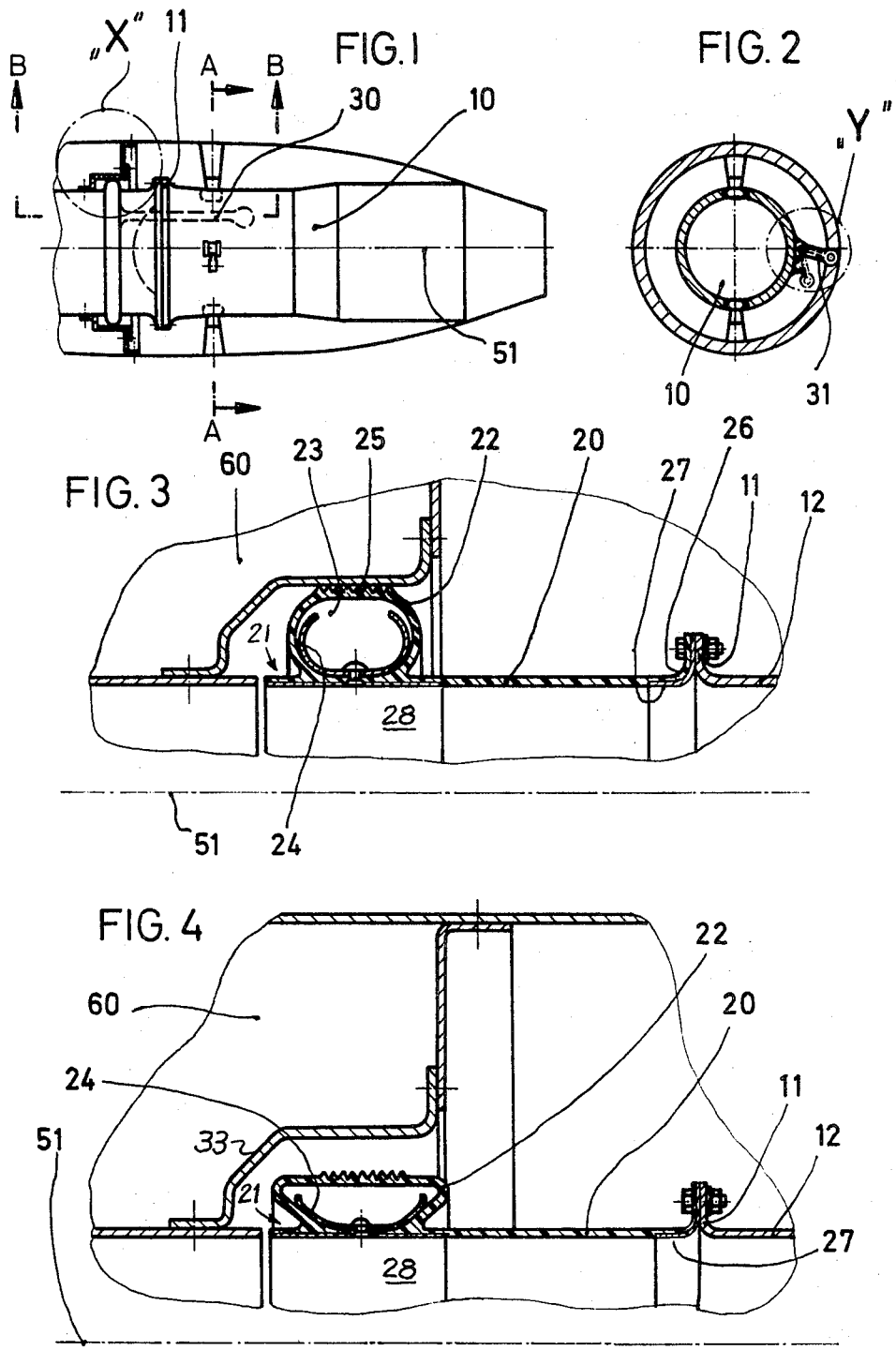

PATENTED JUL 13 1971

INFLATABLE SEAL FOR AIRCRAFT JET ENGINES

BACKGROUND OF THE INVENTION

This invention relates to an inflatable sealing means particularly adapted for use in a jet aircraft. The sealing means provides a seal between the receiving ring of the air intake duct mounted upon the airframe of the aircraft and a jet engine mounted therein.

With respect to prior arrangements, the sealing of the engine intake has been accomplished with ring seals or clamps which usually have introduced leakage resulting in the loss of thrust. Further, such arrangements have generally required considerable installation time. The use of expandable ring seals has often resulted in pressure and thrust loss because such seals are radially as well as axially movable during installation and flight. The necessary sliding fit of the ring in its mating groove results in leakage at the forward surfaces of the ring, and the sliding fit in the intake opening results in leakage at the periphery of the ring. Those embodiments utilizing clamps generally require much greater installation time and afford limited accessibility.

A main object of the present invention is to produce an engine seal which results in a relatively low-pressure loss and which may be conveniently installed. With respect to the illustrated embodiments, a cylinder constructed of flexible material is secured to the intake flange of the jet engine. Formed integrally with the cylinder at the end farthest from the engine is an inflatable annular tube which is connected with the compressor casing of the jet engine by means of suitable piping. So as to provide the necessary clearance requirements during engine installation, within the air chamber defined by the tube is an expandable elastic flattening member which serves to flatten the tube when deflated. Additionally, the tube is provided with a sealing surface. The two ends of the flexible cylinder are stiffened by means of metal rings.

So as to increase the reliability of the overall system, the illustrated embodiment includes one or more control valves which are positively actuated upon removal of the engine by means of an engine mount lever. A valve is provided in the air line from the engine to the inflatable tube with the compressed air line being downwardly disposed when the engine is viewed in its installed position. The latter feature provides drainage for any water which may condense and collect in the line.

The described features ensure a pressuretight seal which, as a result of a directional control valve, prevents pressure drop in the seal should an engine fail. The embodiment affords convenient installation of the engine because the seal, in contrast to arrangements so far known, furnishes ample physical clearance. In addition, the automatic operation of the seal reduces the time required for assembly and disassembly.

Other objects and advantages of the invention will become apparent with reference to the following description and accompanying drawings which show an illustrated embodiment of this invention.

BRIEF DESCRIPTION OF THE DRAWINGS

FIG. 1 is a partial plan view of an embodiment illustrating certain features of this invention.

FIG. 2 is a sectional view taken along line A-A of of FIG. 1.

FIG. 3 is an enlarged sectional view of detail "X" of FIG. 1 with a component thereof in an inflated condition.

FIG. 4 is an enlarged sectional view of detail "X" of FIG. 1 with a component thereof in a deflated condition.

DESCRIPTION OF THE PREFERRED EMBODIMENTS

Figure 5:
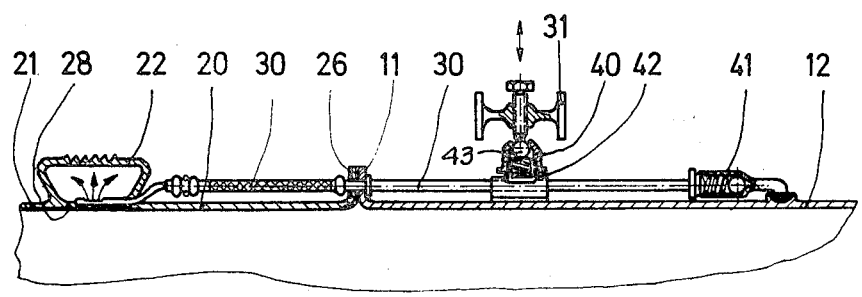
FIG. 5 is a partial sectional view taken along line B-B of FIG. 1.

With respect to FIG. 1 through 4, a compressor casing 12 of a jet engine 10 is illustrated. A combined tube and hose line 30 runs through an intake flange 11 and through flange 26 of a flexible cylindrical member 20 to an annular tube 22. At the end 21 and flange 26 of the cylinder 20, which may be constructed of silicone rubber, are metal rings 27 and 28. The rings 27 and 28 are vulcanized to the tube 20 and serve to stiffen the tube at the ends thereof. The outwardly disposed tube 22, which provides an inflatable gasket, is formed integrally with the cylinder at the end 21. Within the cavity is a resilient member 24 which serves to flatten the hose in its deflated condition. In the deflated condition, the member 24 outwardly forces the sides of the tube 22 so as to reduce the height of the tube thereby providing the desired clearance The tube 22 is provided with sealing lands 25 over its upwardly disposed outer surface as illustrated in FIGS. 3 and 4 to assure the attainment of a suitable seal.

Figure 6:
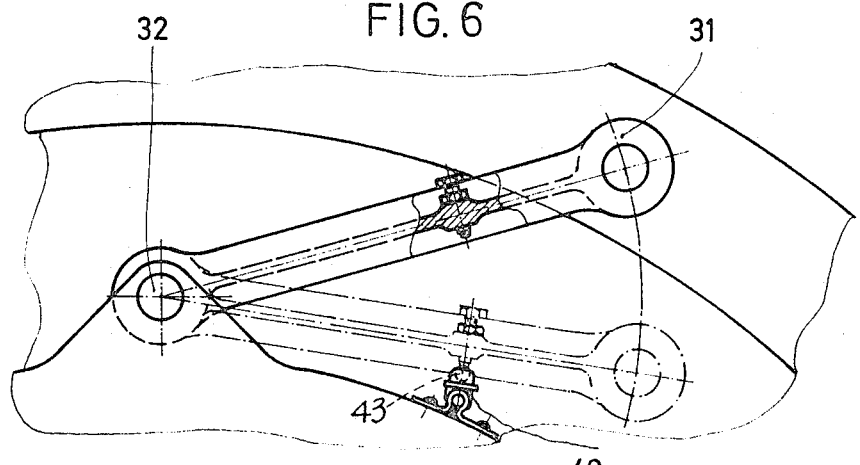
FIG. 6 is an enlarged sectional view of detail "Y" of FIG. 2.

Serving to prevent improper assembly and to facilitate engine installation, a lever 31 serving as part of the forward engine mount 32 is connected so as to control a control valve 40 as illustrated in FIG. 6.

When the engine 10 is installed in position, it is attached to the mounts. At this time, the lever 31 (FIG. 5) at the forward mount 32 is turned out of its locked disassembly position. When the lever is turned upwardly, as viewed in FIG. 5 the spring 42 seats ball 43 and thereby closes control valve 40. Upon actuation of the engine 10, compressed air is caused to flow from the engine compressor through line 30 and a directional control valve 41 into the inflatable annular tube 22. The tube 22 expands forcing the lands 25 against the inside of the receiving ring 33 mounted upon the aircraft frame. This embodiment provides a considerably enlarged fuel compartment 60 with respect to prior known arrangements.

During engine removal, the mount within the airframe is detached after all supply, control and measuring connections have been disconnected. As the lever 31 (FIG. 6) is swiveled into disassembly position, the control valve 40 is opened thereby deflating the tube 22. The elastic flattening elements 24 expand so as to flatten the tube 22. When the engine 10 is nonoperative, the directional flow control valve 41 prevents the tube 22 from deflating.

Figure 7:
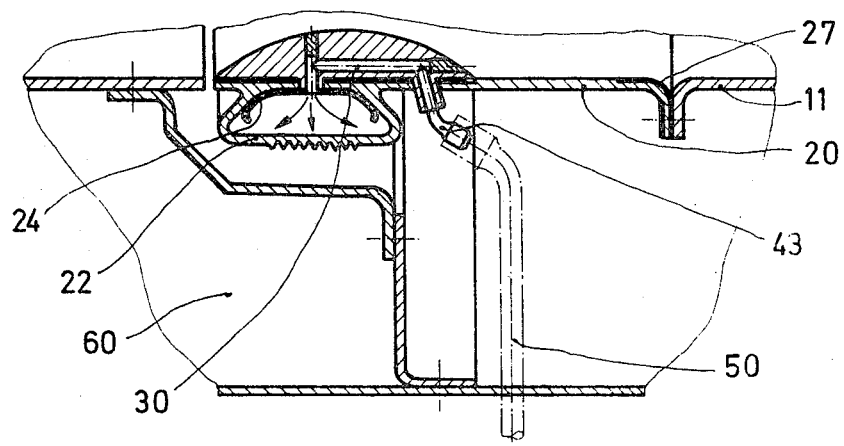
FIG. 7 is a partial sectional view of an alternate embodiment of this invention.

With respect to the alternate embodiment illustrated in FIG. 7, the tube 22 is inflated by means of a suitable pump (not shown) through a line 50 and a valve 43 rather than automatically by the engine as in the previously described embodiment.

Although only two specific embodiments of this invention have been shown and described herein, it will be understood that certain details of the construction shown may be altered without departing from the spirit and scope of this invention.

I claim:

1. An inflatable sealing means particularly adapted for use between an aircraft airframe and a jet engine having an intake flange and a compressor section, said sealing means comprising a resilient cylindrical member forming a wall portion of the engine secured to the intake flange of the engine, and an inflatable annular tube positioned about said cylindrical member.

2. An inflatable sealing means in accordance with claim 1 including a resilient flattening member positioned within said tube for flattening said tube upon the release of pressure therefrom.

3. An inflatable sealing means in accordance with claim 2 wherein a portion of the outwardly disposed surface of said tube is provided with sealing lands.

4. An inflatable sealing means in accordance with claim 3 including means for connecting the compressor of the jet engine with said tube for inflation thereof.

5. A sealing means in accordance with claim 4 wherein said compressor connecting means is disposed to extend in a downward direction when the engine is installed.

6. A sealing means in accordance with claim 5 wherein said tube is provided with at least one control valve, mounting means for said engine including a lever associated with the mounting means and means for causing the actuation of said valve by said lever upon removal of the engine from the aircraft.

7. A sealing means in accordance with claim 4 wherein a directional flow control valve is provided in said connecting means between the engine and said inflatable seal.

8. An inflatable sealing means particularly adapted for use between an aircraft airframe and a jet engine having an intake flange and a compressor section, said sealing means comprising a cylindrical member secured to the intake flange of the engine, an inflatable annular tube positioned about said cylindrical member and a resilient flattening member positioned within said tube for flattening said tube upon the release of pressure therefrom.

9. An inflatable sealing means in accordance with claim 8 wherein a portion of the outwardly disposed surface of said tube is provided with sealing lands.

10. An inflatable sealing means particularly adapted for use between an aircraft airframe and a jet engine having an intake flange and a compressor section, said sealing means comprising a cylindrical member secured to the intake flange of the engine, an inflatable annular tube positioned about said cylindrical member, and means for connecting the compressor of the jet engine with said tube for inflation thereof.

11. A sealing means in accordance with claim 10 wherein a directional flow control valve is provided in said connecting means between the engine and said inflatable seal.